United States Patent [19]

Owatari

[11] Patent Number: 4,489,334
[45] Date of Patent: Dec. 18, 1984

[54] IMMERSIBLE OXYGEN ABSORBING CAPSULE FOR INK JET FLUID SUPPLY

[75] Inventor: Akio Owatari, Shiojiri, Japan
[73] Assignee: Epson Corporation, Tokyo, Japan
[21] Appl. No.: 386,503
[22] Filed: Jun. 9, 1982

[30] Foreign Application Priority Data

Jun. 17, 1981 [JP] Japan ............... 56-93467

[51] Int. Cl.³ ............... G01D 15/18; C09D 11/00
[52] U.S. Cl. ............... 346/104 R; 346/75; 346/1.1; 106/20; 106/22
[58] Field of Search ............... 346/140, 140 R, 140 PD; 106/20, 22; 435/287, 296; 206/205; 422/86

[56] References Cited

U.S. PATENT DOCUMENTS

| | | | |
|---|---|---|---|
| 3,575,882 | 4/1971 | Vandegaer | 252/316 |
| 3,616,263 | 10/1971 | Anandam | 435/287 |
| 4,279,653 | 7/1981 | Makishima et al. | 106/22 |

Primary Examiner—E. A. Goldberg
Assistant Examiner—Gerald E. Preston
Attorney, Agent, or Firm—Blum Kaplan Friedman Silberman & Beran

[57] ABSTRACT

An oxygen absorbing capsule containing an oxygen absorbing material for use in an ink jet printing device is provided. The capsule wall is formed of a resinous material insoluble in the ink composition, but having a large permeability to gases so that oxgyen may be absorbed from the solution. The oxygen absorbing material is preferably an aqueous solution of a salt of pyrogallol. The capsule may be positioned in an ink tank, an ink supply tube or in an ink ejection head of an ink jet recording device for absorbing oxygen from the ink composition. Stable printing, free from nozzle clogging, can thus be carried out for extended intervals of time.

26 Claims, 3 Drawing Figures

IMMERSIBLE OXYGEN ABSORBING CAPSULE FOR INK JET FLUID SUPPLY

BACKGROUND OF THE INVENTION

The invention relates to ink jet recording devices of the ink-on-demand type, and more particularly to improvements in the printing stability of such recording devices.

As shown in FIG. 1, an ink jet recording device of the ink-on-demand type generally includes an ink ejection head 10, an ink supply tube 16 and an ink supply tank 17. Ink ejection head 10 includes a vibratory plate 15 on a substrate 14 with a nozzle orifice 12 coupled to a pressure chamber 13. A piezoelectric element 11 on vibratory plate 15 flexes in response to application of an electrical signal thereto for pressurizing ink in pressure chamber 13. This causes the ink to be expelled through nozzle orifice 12 as ink droplets 12' which are recorded on a recording medium.

In this type of ink-on-demand-type recording process, ink in pressure chamber 13 is subjected to repeated abrupt pressure changes, and tends to give rise to cavitation. This causes formation of air bubbles in pressure chamber 13. Once such air bubbles are formed, they remain trapped in pressure chamber 13 and prevent ink in pressure chamber 13 from being compressed efficiently when piezoelectric element 11 vibrates upon application of the next electrical signal. Insufficient ink compression prevents the stable formation of ink droplets 12' to be expelled from nozzle orifice 12, or prevents the formation of ink droplets themselves. This results in an interrupted printing operation or one wherein the results are adversely affected. illustrated in FIG. 1 and described above has been tested for printing operation using ink (A) saturated with air, and ink (B) deaired under reduced pressure. The test was conducted under conditions wherein an applied voltage of 100 V applied pulses having a pulse width of 100 μsec, at a repetitive frequency of 2 KHz. When ink (A) was employed, after about 10 to 20 minutes following commencement of the printing operation air bubbles were produced in pressure chamber 13. Hence, stable printing could not be performed. When an ink (B) was used, air bubbles were not created after three hours of printing. This permitted stable printing operation to be carried out. The tendency to form air bubbles manifested itself to a great extent as the applied voltage and the repetitive frequency were increased.

It is known that 0.0183 ml of air is dissolvable in 1 ml of water at a temperature of 20° C. and 1 atmosphere pressure. More specifically, 0.0119 ml of nitrogen is dissolvable in 1 ml of water, together with 0.0064 ml of oxygen under these conditions. These dissolved gases can be removed physically by pressure reduction, boiling, or other physical process. These physical gas removing processes are disadvantageous in that nitrogen and oxygen in the atmosphere tend to be dissolved into the ink solution over time, even though the desired properties were available at the initial stages of use.

Chemical gas removal processes have also been proposed. In these processes for chemically reducing dissolved gases, a specific chemical material is added to the ink to reduce dissolved gases, thereby lowering the concentration of the dissolved gases. An example of such chemical process is Japanese Laid-Open patent publication No. 53-61412 corresponding to U.S. Pat. No. 4,279,653. This patent teaches an ink jet ink composition, including a water-soluble wetting agent (humectant), water, a water-soluble dye and an oxygen absorber. The oxygen absorber is a sulphite oxygen absorbing material for reducing the concentration of oxygen in the ink to permit a stable printing operation. However, since the sulphites are generally not readily dissolvable in a polyhydric alcohol, or the like, which serves as a humectant for ink components, the sulphite may tend to clog the nozzle orifice. Additionally, when an oxygen reducing chemical is included in the ink composition, its reducing process also tends to discolor or change the properties of the composition.

It has also been suggested to dispose an oxygen absorbing material outside the ink tank to prevent entry of oxygen from the exterior into the ink tank. One such proposal is contained in Japanese Laid-Open Patent Specification No. 51-148,427. Under this arrangement, it is necessary to remove oxygen dissolved in the ink tank at an initial stage and the ink tank must be double-walled which results in a device which is costly to construct.

Accordingly, it is desirable to provide an oxygen absorbent device which can be utilized in an ink jet recording device to overcome the problems outlined above.

SUMMARY OF THE INVENTION

Generally speaking, in accordance with the invention, an oxygen absorbing capsule containing an oxygen absorbing material for use in removing oxygen from an ink composition in an ink jet recording device is provided. The capsule wall is formed of a resin, such as polyethylene, polyvinyl chloride and polypropylene which is insoluble in the ink composition, but has a large permeability to gas. This permits oxygen to be absorbed from the ink composition without imparting any undesirable properties to the ink composition. The oxygen absorbing material preferably is an aqueous alkaline solution of pyrogallol derivatives, such as alkaline pyrogallol.

The oxygen absorbing capsule may be disposed in the ink tank, in an ink passage below the coupling to the ink tank, at the ink nozzle, or may be in the form of microcapsules dispersed throughout the ink composition.

Accordingly, it is an object of the invention to provide an improved ink jet recording device.

Another object of the invention is to provide an improved oxygen absorbing device for absorbing oxygen from ink in an ink-on-demand type recording device.

A further object of the invention is to provide an ink jet printer having means for deoxidizing ink.

Still another object of the invention is to provide an ink jet printer having means for deoxidizing ink without changing properties of the ink, or discoloring the ink.

It is another object of the invention to provide a means for deoxidizing ink which will prevent nozzle clogging.

It is a further object of the invention to provide an ink jet printer having means for deoxidizing ink which does not adversely affect the cost of construction.

Still other objects and advantages of the invention will in part be obvious and will in part be apparent from the specification.

The invention accordingly comprises the several steps and the relation of one or more of such steps with respect to each of the others, the apparatus embodying features of construction, combinations and arrangement of parts which are adapted to effect such steps, and the product which possess the characteristics, properties and relation of components all as exemplified in the detailed disclosure hereinafter set forth and the scope of the invention will be directed to the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
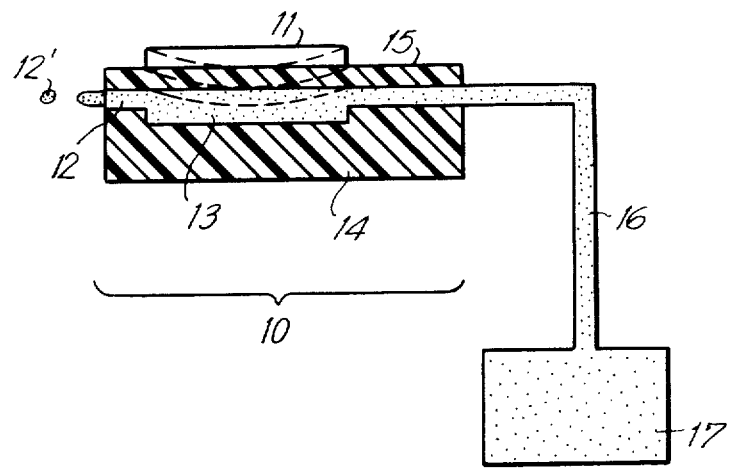
FIG. 1 is a cross-sectional view, in schematic, illustrating the principals of operation of a conventional ink jet recording device of the ink-on-demand type.
Figure 2:
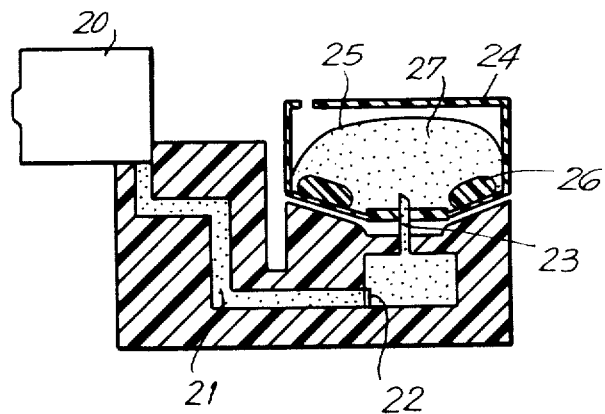
FIG. 2 is a cross-sectional view, in schematic, of an ink jet recording device including oxygen absorbing capsules disposed in the ink tank in accordance with the invention.

FIG. 2 illustrates an ink jet recording device constructed and arranged in accordance with the invention. The recording device includes an ink head 20 coupled to an ink cartridge 24 by an ink supply tube 21 and a tank coupling needle 23. A filter 22 is disposed between tank coupling needle 23 and ink supply tube 21. Ink cartridge 24 includes an ink tank 25 formed of a flexible material having a low permeability to gas. A mass of an ink composition 27 is disposed within ink tank 25 and includes oxygen absorbing capsules 26 containing oxygen absorbing material in accordance with the invention. Mass of ink 27 is shielded by ink tank 25 from the atmosphere so that the concentration of oxygen dissolved from the exterior is small. The walls of capsules 26 including oxygen absorbing materials contained therein are formed on a thin film of material having a large permeability to gas, but insoluble in ink 27. Accordingly, the oxygen absorbing material within capsules 26 does not dissolve in ink 27, but absorbs oxygen from ink 27 through the walls of capsules 26. This maintains the oxygen concentration in ink 27 at a reduced level at all times.

The walls of capsules 26 containing the oxygen absorbing material in accordance with the invention are preferably made of a material having a large permeability to gases, in particular oxygen. The capsule wall may be formed of a resin, such as polyethylene, polyvinyl chloride, or polypropylene. Such resins are highly versatile and easily formed to shape.

The oxygen absorbing material disposed within capsule 26 is preferably an aqueous solution of an oxygen absorbing compound. For example, the oxygen absorbing material may be preferably be an aqueous alkaline solution of pyrogallol derivatives, such as alkaline pyrogallol which has a high selectively to absorb oxygen. An alternative oxygen absorbent material is an aqueous solution of sulphite which has a strong reducing ability.

The following exemplary capsule was prepared in order to demonstrate the effectiveness of the invention. This example is presented by way of illustration and not intended in a limiting sense.

An oxygen absorbing capsule including an aqueous alkaline solution of pyrogallol derivatives was prepared. The aqueous alkaline solution of pyrogallol included 5 parts by weight of pyrogallol, 5 parts by weight of potassium hydroxide and 90 parts by weight of water. The aqueous solution was placed in a capsule formed of a film of polyethylene. The initial dissolved oxygen concentration in an ink composition was 5.3 ppm at a temperature of 20° C. The oxygen absorbing capsule was placed in the ink composition for one day after which the oxygen concentration was reduced substantially to 0. The ink was maintained at an almost zero level of dissolved oxygen after three months of using the printing device.

Printing was effected utilizing an ink (A) which did not contain any of the oxygen absorbing capsules. Printing conditions of an applied voltage of 100 V, applied pulses having widths of 100 $\mu$sec at a repetitive frequency of 2 KHz were utilized. Ink droplets dropped out of the printing orifice after about 10 to 20 minutes, resulting in an unstable printing operation. When an oxygen absorbing capsule of the type described in the example was placed in the ink supply tank, and the same ink composition was utilized, stable continuous printing was possible for three hours under the same printing conditions after the oxygen absorbing capsule was in the ink tank for one day.

These test results indicate that deoxidization is as effective as deaeration. While deaeration is effective at an early stage, oxygen and nitrogen in the air tend to find their way into the ink solution over time. However, in accordance with the present invention, dissolved oxygen is maintained at a low level at all times for providing a continuous supply of deoxidized ink. An advantage in accordance with the present invention is that the ink and the oxygen absorbent material are completely separated from each other. Hence, the ink does not undergo any discoloration or property change and does not result in a clogged nozzle orifice.

Oxygen absorbing capsules in accordance with the invention can be readily prepared by thermally forming a resin to a desired shape and placing the oxygen absorbing solution into the capsule. The capsules are then placed in the ink tank or in an ink cartridge of the ink jet recording device. Thus, stable printing can be accomplished with only a minor additional cost.

In accordance with the embodiment illustrated in FIG. 2, oxygen absorbing capsules 26 are disposed in ink tank 25. By providing oxygen absorbing capsules 26 in this manner, they can be replaced when at the same time as ink tank 25 is replaced after ink 27 therein has been used up. Therefore, deoxidized ink is easily obtainable.

Figure 3:
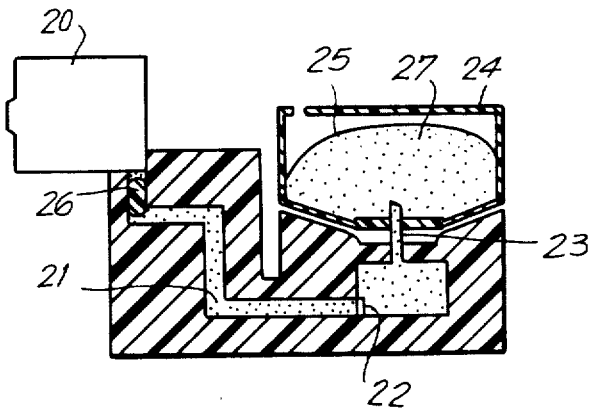
FIG. 3 is a cross-sectional view, in schematic, of an ink jet recording device including an oxygen absorbing capsule in an ink passage of an ink jet recording device in accordance with another embodiment of the invention.

Oxygen absorbing capsules 26 prepared in accordance with the present invention may be located anywhere in the ink passage in the recording device. The position of capsules 26 is not limited to the embodiment as illustrated in FIG. 2. For example, as shown in FIG. 3, capsules 26 may be disposed in ink supply tube 21 adjacent to ink printing head 20. In accordance with this embodiment of the invention, capsule 26 is located as close as possible to printing head 20. This allows printing head 20 to be supplied at all time with ink having as low an oxygen concentration and stable properties as possible. Hence, this prevents the nozzle orifice from becoming clogged even when oxygen enters ink 27 through ink supply tube 21 other than through ink cartridge 24.

The oxygen absorbing material, capsules 26 with the oxygen absorbing material therein and the location of capsules 26 in the ink passage are not limited to the illustrations set forth. The present invention also contemplates further modifications. For example, capsules 26 with oxygen absorbing material therein need not be disposed in the ink tank, but such capsules 26 may be disposed in the ink passage below coupling needle 23 in the ink passage arrangement of FIG. 2. In another modification in accordance with the invention, micro-capsules which are insoluble in the ink composition and containing the oxygen absorbing material may be dispersed throughout the mass of ink. When the arrangements of the present invention are included in a ink jet recording device, oxygen contained in an ink can be held at a low concentration over an extended period of time. This permits stable printing to be carried out for prolonged intervals of time. Furthermore, the ink is not subjected to any property changes or discoloration and does not tend to cause nozzle clogging.

It will thus be seen that the objects set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An oxygen absorbing capsule for use in an ink composition in an ink jet recording device, comprising:
   a capsule immersed in the ink composition with a capsule wall formed of a thin film of material which is insoluble in the ink composition and highly permeable to gases; and
   an oxygen absorbing material encapsulated within the capsule wall, whereby the oxygen absorbing material will not be in direct contact with the ink composition.

2. The oxygen absorbing capsule of claim 1, wherein the oxygen absorbing material is an aqueous alkaline solution of pyrogallol derivatives.

3. The oxygen absorbing capsule of claim 1, wherein the oxygen absorbing material is an aqueous alkaline solution of pyrogallol.

4. The oxygen absorbing capsule of claim 3, wherein the oxygen absorbing material includes 5 parts by weight of pyrogallol, 5 parts by weight of potassium hydroxide amd 90 parts by weight of water.

5. The oxygen absorbing capsule of claim 4, wherein the capsule wall is polyethylene.

6. The oxygen absorbing capsule of claim 1, wherein the oxygen absorbing material is an aqueous solution of a sulphite.

7. The oxygen absorbing capsule of claim 1, wherein the capsule wall is formed of at least one of polyethylene, polyvinyl chloride and polypropylene.

8. A method of removing oxygen from an ink composition in an ink jet recording device comprising placing in said ink composition an oxygen absorbing capsule having a capsule wall formed of a thin film of material which is insoluble in the ink composition and highly permeable to gases, and including an oxygen absorbing material encapsulated within the capsule wall whereby said oxygen absorbing material is not in direct contact with said ink composition.

9. The method of claim 8, wherein the oxygen absorbing material is a aqueous alkaline solution of pyrogallol derivatives.

10. The method of claim 8, wherein the oxygen absorbing material is an aqueous alkaline solution of pyrogallol.

11. The method of claim 10, wherein the oxygen absorbing material includes 5 parts by weight of pyrogallol, 5 parts by weight of potassium hydroxide and 90 parts by weight of water.

12. The method of claim 11, wherein the capsule wall is polyethylene.

13. The method of claim 8, wherein the oxygen absorbing material is an aqueous solution of a sulphite.

14. The method of claim 8, wherein the capsule wall is formed of at least one of polyethylene, polyvinyl chloride and polypropylene.

15. An ink jet recording device, comprising an ink ejection head, an ink storage tank and an ink supply tube for coupling the ink storage tank to the ink ejection head, the ink ejection head including means for selectively pressuring ink therein for ejection, and an oxygen absorbing capsule having a capsule wall which is formed of a thin film of material which is insoluble in an ink composition and highly permeable to gases and including an oxygen absorbing material encapsulated within the capsule wall, said oxygen absorbing capsule being disposed in said ink composition whereby the oxygen absorbing material is not in direct contact with the ink composition.

16. The ink jet recording device of claim 15, wherein the oxygen absorbing capsule is disposed in the ink tank.

17. The ink jet recording device of claim 15, wherein the oxygen absorbing capsule is disposed in the ink suppy tube.

18. The ink jet recording device of claim 15, wherein the oxygen absorbing capsule is disposed in the ink ejection head.

19. The ink jet recording device of claim 15, wherein the oxygen absorbing material in the capsule is an aqueous alkaline solution of pyrogallol derivatives.

20. The ink jet recording device of claim 15, wherein the oxygen absorbing material in the capsule is an aqueous alkaline solution of pyrogallol.

21. The ink jet recording device of claim 20, wherein the capsule wall is polyethylene.

22. The ink jet recording device of claim 15, wherein the oxygen absorbing material is a aqueous solution of a sulphite.

23. The ink jet recording device of claim 15, wherein the capsule wall is formed of at least one of polyethylene, polyvinyl chloride and polypropylene.

24. In an ink composition for use in an ink jet recording device the improvement which comprises a plurality of oxygen absorbing micro-capsules dispersed in the ink, each micro-capsule having a capsule wall formed of a thin film material which is insoluble in the ink composition and highly permeable to gases with an oxygen absorbing material encapsulated within the capsule wall, whereby the oxygen absorbing material is not in direct contact with the ink composition.

25. In combination, an ink composition and an oxygen absorbing capsule for use in an ink jet recording device, comprising:
   a volume of an ink composition; and
   at least one capsule disposed in the ink composition, said capsule having a capsule wall formed of a thin film of material which is insoluble in said ink composition and highly permeable to gases and an oxygen absorbing material encapsulated within the capsule wall so as not to be in direct contact with said ink composition.

26. The combination of claim 25, wherein the oxygen absorbing material is an aqueous alkaline solution of pyrogallol derivatives.

* * * * *